United States Patent
Kreye

(10) Patent No.: US 10,596,890 B2
(45) Date of Patent: Mar. 24, 2020

(54) PANE ASSEMBLY, IN PARTICULAR PANE ASSEMBLY FOR VEHICLE BODY

(71) Applicant: Henniges Automative GmbH & Co. KG, Rehburg-Loccum (DE)

(72) Inventor: Bernhard Kreye, Wenstorf (DE)

(73) Assignee: Hennlges Automotive GmbH & Co. KG, Rehburg-Loccum (DE)

( * ) Notice: Subject to any disclaimer, the term of this patent is extended or adjusted under 35 U.S.C. 154(b) by 0 days.

(21) Appl. No.: 15/749,974

(22) PCT Filed: Aug. 2, 2016

(86) PCT No.: PCT/DE2016/000299
§ 371 (c)(1),
(2) Date: Feb. 2, 2018

(87) PCT Pub. No.: WO2017/020884
PCT Pub. Date: Feb. 9, 2017

(65) Prior Publication Data
US 2018/0222300 A1 Aug. 9, 2018

(30) Foreign Application Priority Data
Aug. 3, 2015 (DE) .......................... 10 2015 010 073

(51) Int. Cl.
*B60J 10/16* (2016.01)
*B60J 1/10* (2006.01)
(Continued)

(52) U.S. Cl.
CPC ................. *B60J 10/16* (2016.02); *B60J 1/10* (2013.01); *B60J 10/70* (2016.02); *E06B 1/36* (2013.01); *B60J 1/18* (2013.01)

(58) Field of Classification Search
CPC .. B60J 10/16; B60J 10/70; B60J 10/18; E06B 1/36
(Continued)

(56) References Cited

U.S. PATENT DOCUMENTS 4,756,944 A * 7/1988 Kisanuki .................. B60J 10/24
428/122
4,833,847 A * 5/1989 Inayama .................. B60J 10/70
296/201
(Continued)

FOREIGN PATENT DOCUMENTS

DE 3333672 A1 4/1985
DE 102010056495 A1 7/2012
(Continued)

*Primary Examiner* — Paola Agudelo
(74) *Attorney, Agent, or Firm* — Howard & Howard Attorneys PLLC

(57) ABSTRACT

In a pane arrangement, in particular a body-pane arrangement, comprising at least one glass pane and a profile frame component bordering the glass pane, placed on the pane edge on one side of the glass pane, it is provided that the profile frame component is multi-layered, and that one layer that may be coated onto the glass pane is made of a hard material and at least one additional layer is made of a soft material, and in that the profile frame component has holding elements that may be engaged with the glass pane in its layer made of hard material, and has protruding projections protruding over the layer of hard material in its layer made of soft material.

8 Claims, 2 Drawing Sheets

(51) Int. Cl.
  *B60J 10/70* (2016.01)
  *E06B 1/36* (2006.01)
  *B60J 1/18* (2006.01)

(58) Field of Classification Search
  USPC ......................................................... 52/208
  See application file for complete search history.

(56) References Cited

U.S. PATENT DOCUMENTS

| | | | | |
|---|---|---|---|---|
| 5,311,711 | A * | 5/1994 | Desir, Sr. | B29C 47/003 |
| | | | | 296/93 |
| 5,743,047 | A * | 4/1998 | Bonne | B60J 10/00 |
| | | | | 49/441 |
| 5,803,527 | A * | 9/1998 | Fujiya | B60J 10/22 |
| | | | | 296/146.15 |
| 6,103,168 | A * | 8/2000 | Kelly | B29C 45/14336 |
| | | | | 156/245 |
| 6,227,598 | B1 * | 5/2001 | Ichioka | B60R 13/04 |
| | | | | 296/93 |
| 6,382,696 | B1 * | 5/2002 | Young | B60J 10/18 |
| | | | | 264/241 |
| 6,740,390 | B2 * | 5/2004 | Randazzo | B29C 45/1676 |
| | | | | 428/122 |
| 9,475,372 | B2 * | 10/2016 | Doniga-Crivat | B60J 10/27 |
| 2001/0003233 | A1 * | 6/2001 | Mikkaichi | B60J 10/24 |
| | | | | 52/208 |
| 2006/0179786 | A1 * | 8/2006 | Kreye | B60J 1/006 |
| | | | | 52/716.5 |
| 2011/0121594 | A1 * | 5/2011 | Kreye | B60R 13/04 |
| | | | | 296/1.08 |

FOREIGN PATENT DOCUMENTS

| | | |
|---|---|---|
| DE | 102011050752 A1 | 12/2012 |
| DE | 202013103364 U1 | 10/2014 |
| DE | 102015007294 B3 | 8/2016 |
| EP | 0268815 A2 | 6/1988 |
| EP | 2110279 A2 | 10/2009 |

* cited by examiner

Detail R

PANE ASSEMBLY, IN PARTICULAR PANE ASSEMBLY FOR VEHICLE BODY

BACKGROUND OF THE INVENTION

Field of the Invention

The invention relates to a pane arrangement, in particular a vehicle body pane arrangement, comprising at least one glass pane and a profile frame component enclosing the edges of the glass pane, which is placed on the edge of one side of the glass pane.

Brief Discussion of the Related Art Pane arrangements of the type described above are assembled for many purposes. For example, such pane arrangements are installed in the bodies of motor vehicles. The profile frame components associated with the glass pane are used to make a connection between glass panes and body components; this connection must be sealed.

Various technologies have been proposed in the prior art for associating profile frame components with a glass pane. Profile frame components may be placed at the edge of a glass pane and connected to the glass pane. In this way, it is possible to bring profile frame components toward both sides of the glass pane, to contact them respectively to the edge of the glass pane, and to bond them to the glass pane in this position. Also known are the injection molding of profile frame components, onto a glass pane or the use of profile frame components extruded directly onto the glass pane.

Frequently in these known profile frame components, an immovable, rigid attachment of the profile frame components to the glass pane is achieved. Profile frame components are inseparably connected to the glass pane, for example by bonding or injection. In this case, it is disadvantageous that, at manufacturing tolerances, it is made more difficult to achieve a sealed installation of e.g. a glass pane in a motor vehicle body. It is for example possible that the glass is not completely flat or has a defined curvature. Even in a motor vehicle body provided for the installation of the glass pane, there may be tolerances that make the fitting of the glass pane difficult.

SUMMARY OF THE INVENTION

The invention has the goal of providing a pane arrangement of the aforementioned type, whereby a tight installation of glass is facilitated, for example in a motor vehicle body.

This objective is accomplished according to the invention in that the profile frame component is multi-layered, with one layer that may be coated onto the glass pane being made of a hard material and at least one additional layer being made of a soft material, and in that the profile frame component has holding elements that may engage with the glass pane in its layer made of hard material, and has protruding projections protruding over the layer of hard material in its layer made of soft material.

In the pane arrangement according to the invention, only one profile frame component is provided. This can be brought near to the glass and contacted to the edge thereof. According to the invention, the profile frame component is formed in multiple layers. It has a layer of hard material, which is placed on one side of the glass pane in the vicinity of the edge thereof. Holding elements are also provided in this hard layer. These holding elements of the hard layer of the profile frame component are connected to the glass pane. This allows the profile frame components to be arranged on the glass pane preferably without the use of adhesive.

The profile frame component according to this invention has an additional layer, and this additional layer is made of a soft material. The second layer covers the first layer of the profile frame component; in addition, according to the invention, it has projections protruding over the layer made of hard material. Due to the projection beyond the hard layer, it is possible for the soft layer to abut additional components. An additional component is, for example, the glass pane, so that a projection of the soft layer over the hard layer may be contacted to the glass pane and may adjust for tolerances that may occur. In the same way, a projection of the soft material layer may project so far that it contacts a flange of a motor vehicle body when the pane arrangement according to the invention has arrived at its installation location. Tolerances in the range of the motor vehicle body provided here may also be compensated for.

The projections of soft material abutting other components may preferably exert a pressure on the profile frame component and glass pane, which are connected to one another by holding elements, so that the profile frame component is conducted against the glass pane. The glass pane is typically attached to the vehicle body by means of adhesive.

The holding elements for the profile frame component preferably comprise latches. A latch may be guided behind the edge of a glass pane and hooked thereto. This results in a permanent connection between the profile frame component and the glass pane if they may no longer move freely relative to each other, and instead remain in a defined position. It nonetheless remains possible to release the holding elements from the glass pane. For example, for recycling purposes, the profile frame component may be separated from the glass pane, so that materials may be sorted.

The projections of the layer of soft material, according to a modification of the invention, each have a lip shape. A lip shape of this kind may contact another component, which may cause the lips to be compressed, but they will nonetheless retain their sealing contact. It is possible that a lip of the surface of the layer made of soft material may be formed so as to project approximately perpendicularly, in order to bridge a larger gap between the pane assembly and e.g. the associated body flange.

According to a further modification, the profile frame component according to the invention may be placed on the glass pane in such a way that cavities remain between the glass pane surface and the hard layer. These cavities are not filled with material, which advantageously reduces the weight of the profile frame component according to the invention. Materials are also saved, thereby advantageously reducing the manufacturing costs.

According to an additional modification of the invention, the profile frame component has a stirrup shape in cross-section, has contact surfaces for contacting the glass pane and has a hard layer that is covered by the layer of soft material. The profile frame component may thus intermittently contact the glass pane and via an appropriately configured width may cover an adhesive bead on the other side of the glass pane. Covering of the hard layer of the profile frame component by the layer of soft material additionally results in a pleasant feel as well as an attractive design option for the profile frame component. The stirrup shape of the profile frame component encloses cavities. The profile frame component may be manufactured in this way so as to save materials, and thereby save weight.

The profile frame component may also be supplemented with a decorative strip. This imparts a high-quality appearance to the pane arrangement according to the invention.

With respect to the production technique, the layer of soft material may be sprayed onto the layer of hard material. This provides for an efficient manufacture, and both layers are also firmly connected to one another.

The hard layer of the profile frame component may be, for example, made of a hard plastic such as PP, ABS or hard PVC. The additional layer of the profile frame component, in contrast, is preferably made of a soft plastic such as TPE or soft PVC.

When working on difficult cross sections, an adhesive may also be applied to the contact surfaces of the profile frame component. This supports arranging the profile frame component on the glass pane.

Bonding the hard component with MS polymer is advantageous. In this case, MS polymer does not require applying primer to the glass pane. The plastic material of the profile frame component may be pretreated with flame or with an atmospheric plasma. Alternatively, bonding with one-component or two-component polyurethane is possible. In this case, the glass requires pretreatment (primer application). Bonding with hot melt adhesive is also suitable. Both these adhesives may also be used together. MS polymer cures slowly, while the hot melt ensures secure adhesion until the MS polymer has fully solidified.

Typically, glass panes are glued onto a vehicle body. To fix the pane in place, clips are then often fastened on the inside of the pane; these clips then ensure a positionally accurate alignment of the pane, and hold the pane in position until the adhesive has cured. In this case, these clips may be fastened with the same adhesive system as the frame component.

BRIEF DESCRIPTION OF THE DRAWINGS

An embodiment that yields further inventive features is shown in the drawings. To wit.

DETAILED DESCRIPTION OF THE PREFERRED EMBODIMENTS

Figure 1:
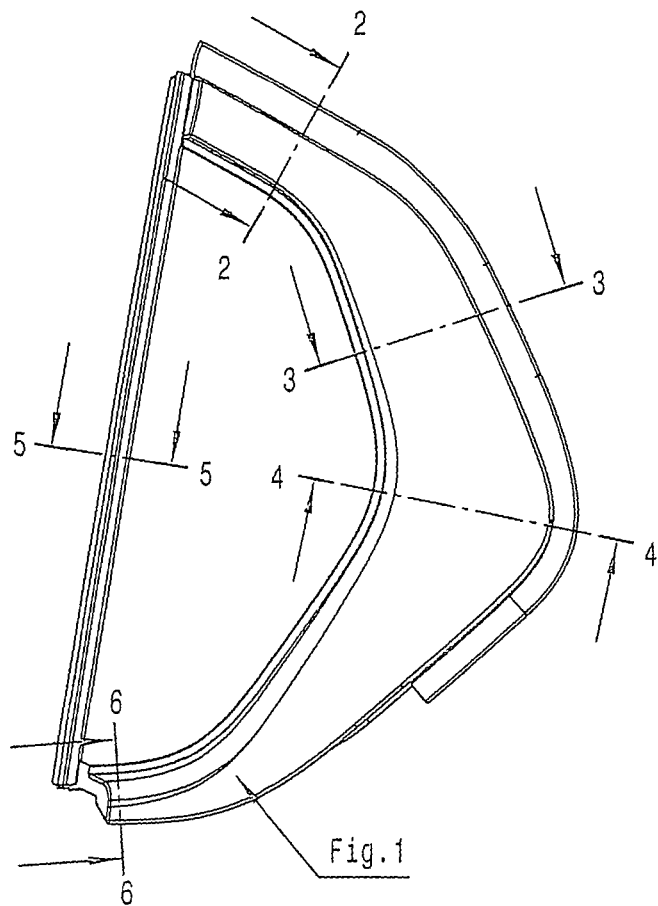
FIG. 1: a side view of a body-pane arrangement according to the invention

The pane arrangement in FIG. 1 features a glass pane 1 and two pane arrangements according to the invention. The glass pane 1 is provided, for example, for a rear side window of a motor vehicle; it is installed in a stationary position in a motor vehicle body. A flange 6 of a motor vehicle body is shown in FIG. 3.

Figure 2:
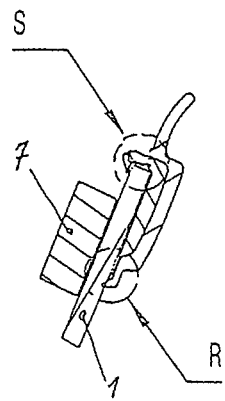
FIG. 2: a sectional view along the section line 2-2 in FIG. 1.
Figure 3:
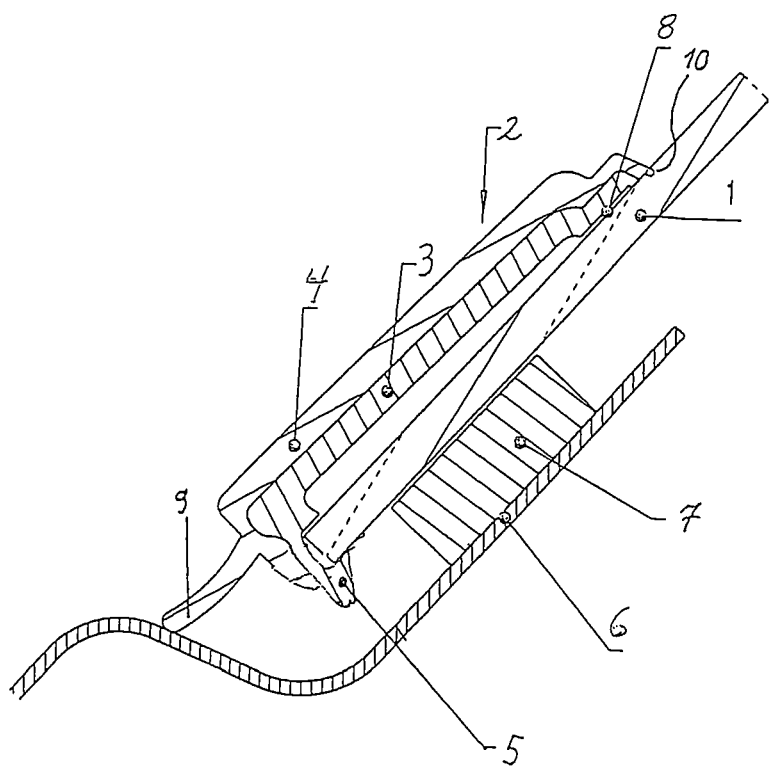
FIG. 3: a sectional view along the section line 3-3 in FIG. 1.
Figure 4:
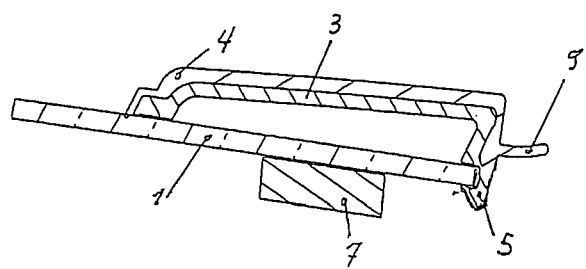
FIG. 4: a sectional view along the section line 4-4 in FIG. 1.
Figure 6:
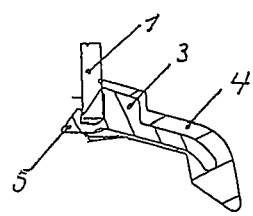
FIG. 6: a sectional view along the section line 6-6 in FIG. 1.

FIG. 3 shows a pane arrangement arranged at a 180° angle to the glass pane 1 in FIG. 1. The sectional views in FIGS. 2, 4 and 6 also show this pane arrangement.

The pane arrangement comprises a profile frame component 2. The profile frame component 2 consists of a layer 3 of hard material and a layer 4 of soft material. Both layers 3, 4 are fixedly connected to each other, for example by spraying the soft layer 4 onto the hard layer 3.

The hard layer 3 has a holding element that may enter into a holding connection with the glass pane 1. The holding element is formed by a latch 5 provided by the hard layer 3, which is guided over the edge of the glass pane 1. The profile frame component 2 is connected by this holding element to the edge of the glass pane 1.

The soft layer 4 of the profile frame component 2 completely covers the hard layer 3 of the profile frame component 2. The soft layer also has projections 9 and 10 protruding over the hard layer 3. These projections 9, 10 protrude beyond the hard layer 3 and may be contacted to adjacent components. In this way, the projection 10 is conducted against the glass pane 1. This projection 10 seals the contact between the profile frame component 2 and the glass pane 1 in this area. The other projection 9 protrudes vertically from the surface of the profile frame component 2 and forms a sealing lip, which is conducted against the body flange 6. In this way, the gap between the edge of the pane assembly and the associated body flange 6 is bridged and sealed.

FIG. 3 also shows that a cavity 11 remains between the surface of the glass pane 1 and the hard layer 3. This cavity 11 is enclosed by the profile frame component 1; because of the incomplete filling of the profile frame component, the use of material is reduced, as is the weight.

The overall design of the projection 9 may also be seen in FIG. 1.

Figure 2A:
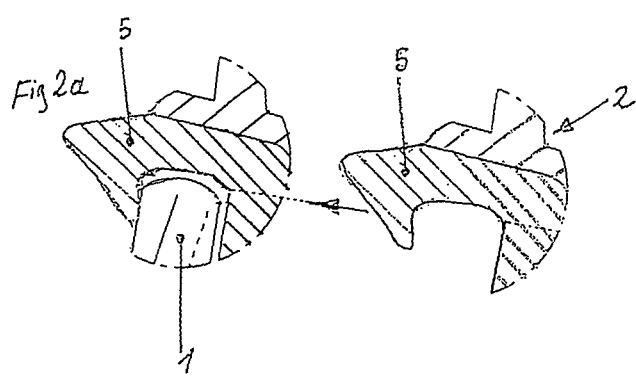
FIG. 2a: a partial view of the detail S in FIG. 2, enlarged to scale.

FIG. 2a shows the design of the holding elements in detail. The latch 5 of the profile frame component 2 is guided over the edge of the glass pane 1.

Figure 2B:
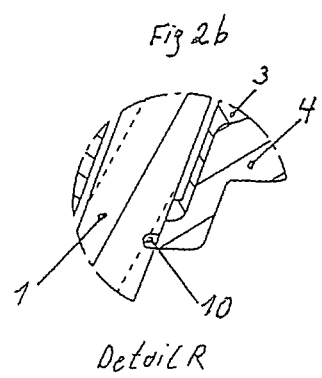
FIG. 2b: a partial view of the detail R in FIG. 2, enlarged to scale.

In FIG. 2b, the protrusion of the soft layer 4 over the hard layer 3 in the profile frame component 2 may once again be observed.

Figure 5:
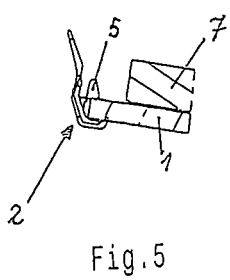
FIG. 5: a sectional view along the section line 5-5 in FIG. 1.

The straight edge of the glass pane 1 in FIG. 1 is also associated with a pane arrangement according to the invention, as shown in FIG. 5. Here again, a profile frame component 2 with the design according to the invention is associated with an edge of the glass pane 1.

Any of the features mentioned in the preceding description and in the claims may be freely selected and combined with the features of the independent claim. The disclosure of the invention is thus not limited to the described or claimed combinations of features; rather, all feature combinations that are reasonable in the context of the invention should be considered disclosed.

The invention claimed is:

1. A pane arrangement, comprising:
    a glass pane, having a first main surface, a second main surface opposite the first main surface and a pane edge joining the first main surface and the second main surface; and
    a profile frame component bordering the glass pane, the profile frame component being located on the pane edge and on the first main surface of the glass pane,
    wherein the profile frame component is multi-layered, including a first layer and a second layer, said first layer being between the second layer and the first main surface, said first layer being harder than said second layer, and the first and second layers being integrally connected, the first layer having at least one holding element engaged with the glass pane, and the second layer having protruding projections protruding over the first layer;

wherein the glass pane is in direct contact with the profile frame component except where a cavity is located between the first main surface of the glass pane and the first layer;

wherein the at least one holding element comprises at least one latch that grasps the glass pane on the pane edge and on a corner of the second main surface, but not on the remainder of the second main surface;

wherein the profile frame component has a stirrup shape in cross-section and has contact surfaces for contacting the glass pane; and wherein the second layer is sprayingly connected to the first layer.

2. The pane arrangement according to claim 1, wherein the protruding projections are each respectively lip-shaped.

3. The pane arrangement according to claim 2, wherein the lip-shaped protruding projections project approximately perpendicularly from a surface of the profile frame component.

4. The pane arrangement according to claim 1, wherein the first layer is made of PP, ABS, or hard PVC, and the second layer is made of TPE or soft PVC.

5. The pane arrangement according to claim 1, wherein the pane arrangement is included in a vehicle body.

6. The pane arrangement according to claim 1, wherein the second layer has two projections located at opposite ends of the cavity.

7. The pane arrangement according to claim 1, wherein the cavity extends over a majority of the length of the profile frame component.

8. The pane arrangement according to claim 1, wherein the pane arrangement comprises only the glass pane and the profile frame component.

* * * * *

UNITED STATES PATENT AND TRADEMARK OFFICE
CERTIFICATE OF CORRECTION

PATENT NO. : 10,596,890 B2  
APPLICATION NO. : 15/749974  
DATED : March 24, 2020  
INVENTOR(S) : Bernhard Kreye Page 1 of 1

It is certified that error appears in the above-identified patent and that said Letters Patent is hereby corrected as shown below:

On the Title Page

Item (73), in Assignee section: please replace "Hennlges" with --Henniges--

Signed and Sealed this  
Third Day of November, 2020

Andrei Iancu  
*Director of the United States Patent and Trademark Office*